United States Patent
Tipler et al.

(10) Patent No.: US 6,429,156 B1
(45) Date of Patent: *Aug. 6, 2002

(54) SUBSTANCE RELEASING MATERIALS

(76) Inventors: Keith Charles Tipler, Sennock House, Coton Lane, Ranton, Staffordshire ST18 9JY; Ivan Robert Tatt, 38 Hartlands Road, Eccleshall, Staffordshire ST21 6DW, both of (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,287
(22) PCT Filed: Oct. 2, 1995
(86) PCT No.: PCT/GB95/02330
§ 371 (c)(1), (2), (4) Date: May 28, 1997
(87) PCT Pub. No.: WO96/10905
PCT Pub. Date: Apr. 18, 1996

(30) Foreign Application Priority Data

Oct. 6, 1994 (GB) .............................................. 9420153
Jul. 15, 1995 (GB) .............................................. 9514523

(51) Int. Cl.[7] .......................... B32B 27/04; B32B 27/12; B32B 5/02
(52) U.S. Cl. ......................... 442/123; 442/93; 442/121; 442/76; 428/343; 428/354; 428/346; 428/907
(58) Field of Search ................................ 428/354, 343, 428/346, 907; 442/93, 121, 123, 76

(56) References Cited

U.S. PATENT DOCUMENTS

| 3,160,986 A | * | 12/1964 | Watson |
| 3,346,398 A | * | 10/1967 | Tundermann |
| 3,559,562 A | * | 2/1971 | Carlson |
| 3,833,401 A | * | 9/1974 | Ingram |
| 4,401,213 A | * | 8/1983 | Lerner |
| 5,672,434 A | * | 9/1997 | Dalebroux et al. ...... 428/537.5 |
| 5,707,736 A | * | 1/1998 | Levy et al. .................. 428/375 |

FOREIGN PATENT DOCUMENTS

| DE | 2348512 | * | 9/1973 |
| DE | 4022413 | * | 7/1990 |
| EP | 105023 | * | 4/1984 |
| EP | 571228 | * | 11/1993 |

* cited by examiner

Primary Examiner—Terrel Morris
Assistant Examiner—Arti R. Singh
(74) Attorney, Agent, or Firm—Bracewell & Patterson, L.L.P.

(57) ABSTRACT

There is disclosed a substance releasing material including a substrate having at least one beneficial substance adhered thereto by at least one layer of bonding agent. The beneficial substance or substances is releasable by the action of a release agent. Examples of the beneficial substance include an anti-rust agent, a foodstuff preservative, a sterilising agent, and a foodstuff flavouring.

23 Claims, 1 Drawing Sheet

SUBSTANCE RELEASING MATERIALS

This invention concerns substance releasing materials which may provide phased release of said substance over a period of time. The invention relates particularly, though by no means exclusively, to product packaging materials which release a substance for purposes beneficial to the product contained therein, and to mulches for agricultural and horticultural use.

Regarding the latter application, techniques have been developed recently to enhance plant growth by covering the soil with a mulch. A mulch can be any suitable product such as fibrous materials (eg cotton waste or wood chippings), paper or board of plastic sheeting (film).

The concept is to improve the growth of the desirable plant (crop) due to improved soil warming, improved germination, undesirable plant growth suppression (weeds), improved soil moisture retention, either by each individual factor, or in any combination. Lately, the use of plastic film has grown, and in particular by modifying the structure of the film, several of the above desirable features have been developed. This can include such items as infra-red retention (soil warming), varying biodegradability films to suit the plants growth season and by degrading rendering the plastic harmless, or conversely non-degradable so that it may be re-used.

Any weed suppression benefits from a mulch, are due to barrier effects, either mechanical or light whereby the weed cannot "see" the light and hence cannot photosynthesise. These types of mulches are usually wood or bark chippings and are used in parks and recreation grounds to lower weeding costs. They are expensive to apply and, since they are slow to rot, they are not suitable for agricultural applications.

As seen in the large scale applications, film is used in cash value crops such as early potatoes, lettuce, leeks and cut flowers. This enables the grower to benefit from earlier maturation, and thus gain from higher early to market prices. Higher yields are also a frequent bonus. Two techniques are used. The first is to sow the crop, usually in beds, and then the plastic is laid over the bed in a strip and a small amount of soil is ploughed back over the edges to prevent the wind from lifting the sheet and blowing it away. Once the crop germinates and shows sufficient growth above the soil surface, the film is removed, since it cannot break through the plastic. In this instant, non-degradable film is used.

The second method uses degradable film which remains on the soil. The seed is drilled through the plastic by piercing it, and the plant then grows through it. Depending upon the composition of the film, it degrades and after harvest any remains are ploughed into the soil. The degradation mechanism is normally activated by moisture, but ultra-violet light types can also be used.

There are two major problems with using mulches in this manner. The first is that the beneficial growing environment for the crop is also good for stimulating weed growth. Control of this undesirable side effect is by use of pre-emergence sprays whereby the land is sprayed before the crop is sown. This in its turn has problems since the grower has to guess what weeds will become a problem, and thus the type of spray to use, as well as the added costs involved with this operation, which in any case may not be necessary. In addition, the use of such sprays is not always very effective, and there is the additional problem of added pollution.

The second problem is that it is not possible to travel over the land after application of the mulch since this will damage the film. Any subsequent applications of pesticides and/or fungicides are not possible except by the expensive use of aircraft, and the film itself prevents the absorption into the soil (and then into the plant) of herbicides or later applications of fertiliser.

Once the crop is sufficiently established and damage to the film no longer matters, sprayers can travel over the land. This in turn means that the grower's natural tendency is to overuse sprays as a preventative measure, thus leading to pollution problems. The spray is spread universally, over what will become food with the possibility of as yet unknown health problems. Dosage rates have to be carefully administered to ensure effectiveness without crop damage, since it is not possible to direct the spray away from the crop.

It is another object of the present invention to provide product packaging materials which permit the phased release of a substance, or substances, beneficial to the product.

According to the invention, there is provided a substance releasing material comprising a substrate having at least one beneficial substance adhered thereto by at least one layer of bonding agent, in which phased release of the beneficial substance or substances is effected by the action of a release agent on the bonding agent.

The substance or substances may be coated onto the substrate and overlaid with the bonding agent.

The substance or substances may be contained within the layer or layers of bonding agent.

The substance material may comprise multiple layers of bonding agent and beneficial substance or substances.

According to one aspect of the invention, the substrate comprises packaging for a product, and the release of the substance is beneficial to the product.

The packaging may comprise plastic, paper, cardboard or a woven material.

The packaging may comprise an insert.

The substrate may have one layer of bonding agent including the substance or, alternatively, the layer may include a plurality of substances.

The substrate may have a plurality of layers of bonding agent.

The bonding agent may be a lacquer.

The release agent may permeate the substrate prior to acting upon the bonding agent, in which instance the release agent may be atmospheric oxygen, carbon dioxide or water.

The release agent may be introduced into the package comprising the product and the packaging.

The release agent may be contained in the product itself.

The release agent may be heat.

The substance may comprise an anti-rust agent.

The substance may comprise a foodstuff preservative, which may be an anti-oxidant or an essential oil.

The substance may comprise a sterilising agent.

The substance may comprise a foodstuff flavouring.

The layer, or layers may be coated onto the substrate, and the coating may be performed using a printing technique. Designs or text may be simultaneously printed onto the substrate.

According to another aspect of the invention, there is provided a mulch comprising a sheet substrate which has been coated with one or more substances beneficial to crop growth and overcoated with at least one layer of bonding agent. Examples of substances beneficial to crop growth are fertilisers, insecticides, pesticides, fungicides, nematicides and herbicides.

The substance or substances may be print coated. The bonding agent may be a lacquer.

The sheet may be of plastics, paper or textile fabric.

The sheet may be impervious or perforated to allow moisture to pass therethrough.

The sheet may be transparent or coloured.

The density of the coating of different substances may vary across the width of the sheet.

Fertilisers, insecticides, pesticides, fungicides or nematicides, or combinations thereof may be concentrated on areas of the sheet which will overlay the crop.

Herbicides may be concentrated on areas of the sheet which will overlay the spaces between adjacent rows of crop.

Seed may be adhered to the mulch before it is laid.

The bonding agent may be printed at a central facility or at an on site mobile facility at the time it is laid.

The invention will be further apparent from the following descriptions with reference to the figures of the accompanying drawings which show, by way of example only, embodiment of substance releasing materials.

Figure 1:
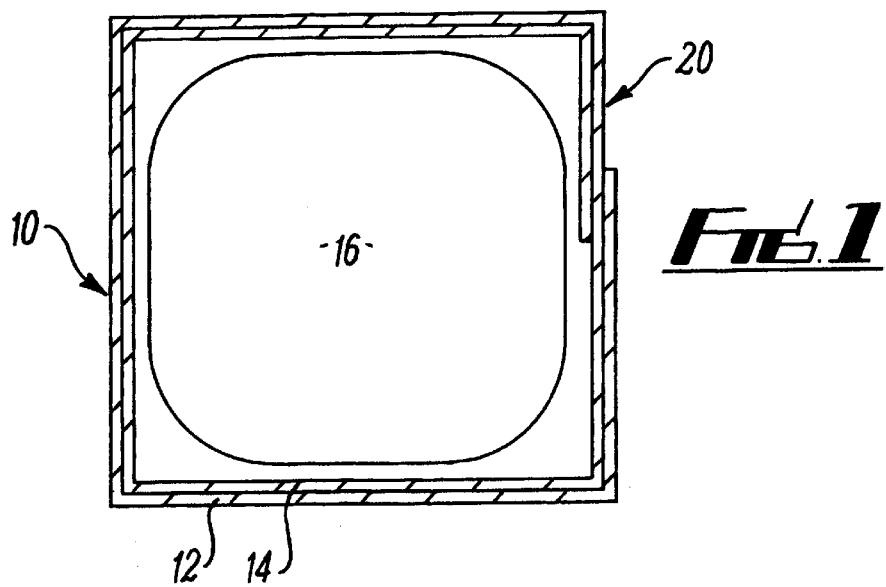
FIG. 1 shows a cross-section through a package.

FIG. 1 shows a substance releasing material 10 comprising a substrate 12 coated with a layer 14 of a bonding agent containing at least one beneficial substance which substance, or substances, are released by the action of a release agent upon the bonding agent. The substrate 12 comprises, as shown in FIG. 1 packaging 20 for a product 16, and the release of the substance is beneficial thereto. Thus, the invention provides product packaging material which, over a period of time, delivers in situ quantities of a substance to the product, the subsequent effect of the substance being in some way beneficial to the product. Some representative examples of beneficial substances are provided below.

In a preferred embodiment, the packaging is a plastic such as plastic film, but it may also be paper, cardboard or a woven material suitable for coating with the layer, or layers, of bonding agent and substance or substances.

The packaging need not comprise the 'external' product wrapping as depicted in FIG. 1. The production of a substance releasing 'insert' is also within the scope of the invention. An insert is defined as a item of packaging contained within the external product wrapping. An example is the plastic mat commonly used in the packaging of meat.

The substrate 12 may comprise a single layer 14 of bonding agent containing one substance or, alternatively, the layer may contain a plurality of substances for simultaneous release thereof. It is also within the scope of the invention to provide a substrate having multiple layers. The multiple layers may comprise different substances, permitting phased release over a period of time, or the same substance, allowing for longer exposure of the product thereto.

The bonding agent comprises any composition which, after mixing with the substance, performs the following functions:

i) bonds to the substrate: and ii) releases the substance once exposed to a releasing agent.

A lacquer such as Shellac may be employed as the bonding agent.

The release agent is any agent that reacts with the bonding agent, causing the substance to be released. In one embodiment, the release agent permeates the substrate 12 to act upon the bonding agent, in which instance the release agent may be a naturally occurring atmospheric constituent such as oxygen, carbon dioxide or water.

In a second embodiment, the release agent is introduced into the package comprising the product 16 and the substrate 12.

In a third embodiment, the release agent is contained in the product 16 itself. An example is the naturally occurring release of moisture by packaged foodstuffs; said moisture may be utilised as the release agent to release a substance such as thyme oil which absorbs carbon dioxide. Carbon dioxide is released by foodstuffs during storage and if not removed, causes deterioration of same.

It should be noted that the release agent need not be a single chemical as the presence of two or more chemicals could be necessary, for instance, moisture and carbon dioxide, before the bonding agent releases the substance. It should also be noted that, for a given bonding agent, there need not be a unique release agent; for instance, either carbon dioxide or moisture may suffice.

There are many examples of substances which have beneficial effects upon certain products. Thus the substance may be an anti-rust agent for metal products, a preservative, such as an anti-oxidant for foodstuffs, or a sterilising agent for medical products. Another example (with application to foodstuffs packaging) is provided by essential oils, such as rosemary oils, which absorb dioxins from foodstuffs and, additionally, inhibit dioxin generating bacterial growth. The presence of dioxins accelerates the deterioration of foodstuffs.

In a further example the beneficial substance is a foodstuff flavouring and the release agent is heat, or a combination of heat and moisture. The flavouring may, therefore, be released during cooking.

The layer 14 may be coated onto the substrate 12 by methods well known to those skilled in the art. The thickness of the coating and the substance concentration may be varied, and the coating process may involve the production of multiple layers. These factors, together with the kinetics of both release agent transport into the vicinity of the layer or layers and subsequent release agent—bonding agent interactions, determine the release time of the substance from the bonding agent. The coating may be performed by a printing technique in which a mixed solution of bonding agent and substance is applied to, for example, a plastic packaging film.

Advantageously, text or designs, including logos, advertisements, instructions, safety precautions etc., may be simultaneously printed onto the film. This layer is dried and, at a later stage in the process, successive layers of bonding agent applied.

The premixing of bonding agent and beneficial substance is not an essential requirement, it being possible to coat the substrate with the substance or substances and seal the coating with a layer of bonding agent.

The invention also provides a mulch capable of providing phased release of one or more substances beneficial to plant growth.

Figure 2:
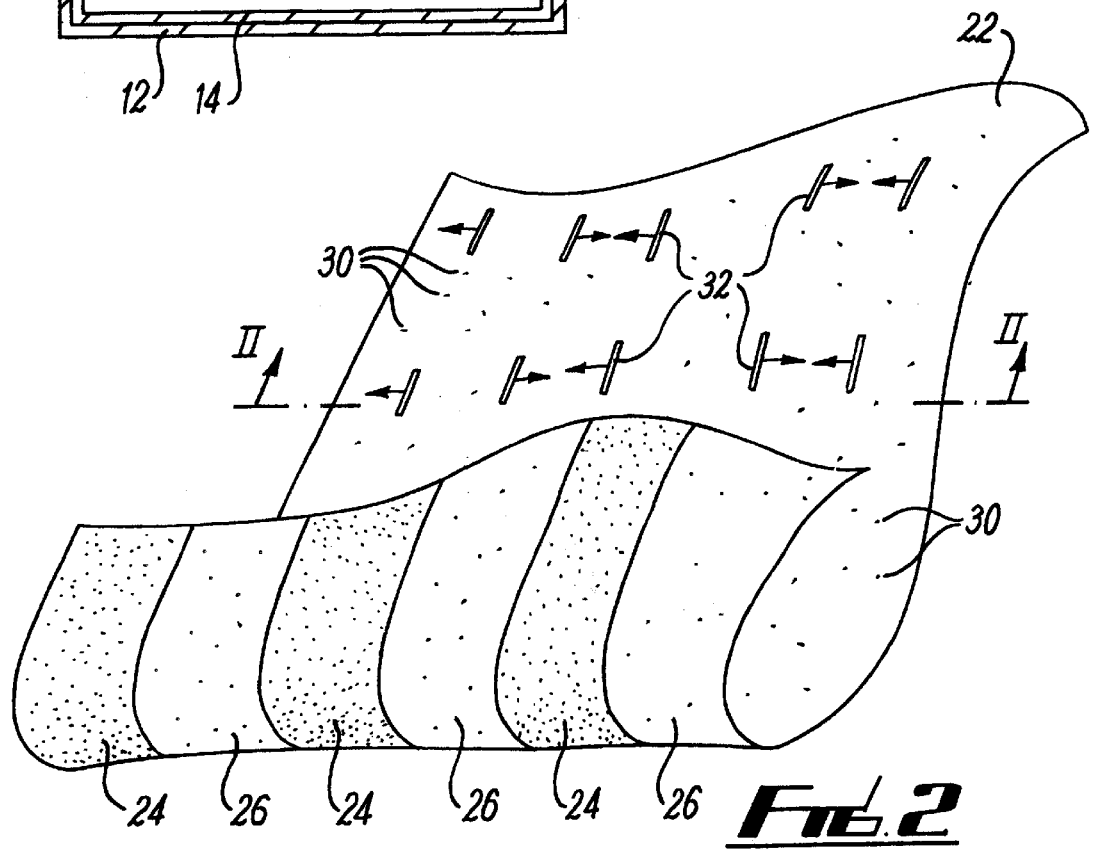
FIG. 2 shows a perspective view of the mulch.
Figure 3:
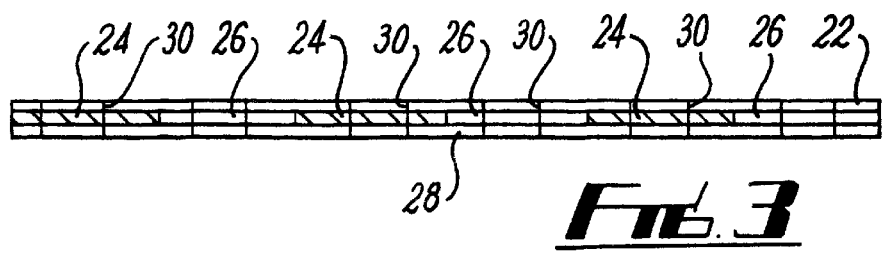
FIG. 3 shows a cross section through the mulch on the line II—II of FIG. 1.

Referring now to FIGS. 2 and 3, it will be seen that the mulch comprises a sheet 22 of low density polyethylene film which is transparent and made from a degradable base material. The width of the sheet is 1 m.

The sheet is print coated on its underside with strips 24 of fertiliser alternating with strips 26 of herbicide.

The printed coatings are sealed with a coating of lacquer 28, such as Shellac.

The film is perforated by micro-holes 30.

In use the mulch is laid over an area of land as drilling occurs, and the seed planted through the mulch, such that the strips 24 overlay the rows of seed and the strips 26 the spaces between adjacent rows. Indicia 32 is printed on the upper face of the sheet 22 to identify the location of the strips 24 to facilitate proper placement of the mulch as it is laid.

The action of a release agent such as moisture (which can pass through the holes 30) on the lacquer 28 permits phased release of the fertiliser 24 and herbicide 26 over a period of time.

It will be appreciated that it is not intended to limit the invention to the above example only, many variations, such as might readily occur to one skilled in the art, being possible, without departing from the scope thereof For instance, non-degradable base materials are also within the scope of the invention.

What is claimed is:

1. A substance releasing material comprising a mulch having a sheet substrate which has been coated in alternating strips with one or more substances beneficial to crop growth and overcoated with at least one layer of bonding agent, the alternating strips alternating between strips having fertilizers, insecticides, pesticides, fungicides, nematicides, or combinations thereof, and strips having herbicides.

2. A substance releasing material according to claim 1 in which the substance or substances are print coated.

3. A substance releasing material according to claim 1 in which the bonding agent is a lacquer.

4. A substance releasing material according to claim 3 in which the lacquer is shellac.

5. A substance releasing material according to claim 1 in which the sheet substrate is made of plastic, paper or textile fabric.

6. A substance releasing material according to claim 5 in which the sheet substrate is impervious to moisture.

7. A substance releasing material according to claim 5 in which the sheet substrate is perforated.

8. A substance releasing material according to claim 5 in which the density of the coating of different substances varies across the width of the sheet substrate.

9. A substance releasing material according to claim 8 in which fertilizers, insecticides, pesticides, fungicides, or nematicides, or combinations thereof are concentrated on areas of the sheet substrate which overlay a crop.

10. A substance releasing material according to claim 8 in which herbicides are concentrated on areas of the sheet substrate which overlay spaces between adjacent rows of a crop.

11. A substance releasing material according to claim 1 in which the seed is adhered to the strips having fertilizers, insecticides, pesticides, fungicides, nematicides, or combinations thereof before the mulch is laid.

12. A method of preserving a foodstuff, comprising:

(a) providing a packaging having a substrate;

(b) adhering at least one beneficial substance to the packaging with at least one layer of a bonding agent; then (c) packaging the foodstuff with the packaging; then (d) effecting phased release of the beneficial substance by exposing the bonding agent to a release agent, causing the bonding agent to release the beneficial substance from the packaging for interaction with the foodstuff without the bonding agent or the releasing agent reacting with the beneficial substance.

13. The method according to claim 12, wherein in step (d) comprises providing as the beneficial substance an oil.

14. The method according to claim 12, wherein step (b) comprises providing as the beneficial substance an oil that will absorb carbon dioxide; and in step (d)

the oil once released from the substrate absorbs carbon dioxide released by the foodstuff.

15. The method according to claim 12, wherein step (b) comprises providing as the beneficial substance an oil that will absorb dioxins; and in step (d)

the oil once released from the substrate absorbs dioxins from the foodstuff.

16. The method according to claim 12, wherein step (b) comprises providing a flavoring as the beneficial substance; and in step (d)

the release agent comprises heat due to cooking of the foodstuff.

17. The method according to claim 12, wherein step (b) comprises providing as the beneficial substance a sterilizing agent; and in step (d)

the sterilizing agent once released from the substrate acts on the foodstuff to sterilize the foodstuff.

18. The method according to claim 12, wherein step (b) comprises printing the bonding agent on the substrate in a printing process.

19. The method according to claim 12, wherein step (b) comprises applying a plurality of layers of bonding agents, each retaining one of the beneficial substances; and step (d) comprises releasing the beneficial substances in each of the layers of bonding agents sequentially in a phased release over a period of time.

20. The method according to claim 12, wherein step (b) comprises applying a plurality of layers of bonding agents, each retaining one of the beneficial substances, the beneficial substance in at least one of the layers differing from the beneficial substance in at least one other of the layers; and step (d) comprises releasing the beneficial substances in each of the layers of bonding agents sequentially in a phased release over a period of time.

21. The method according to claim 12 wherein the packaging is selected from the group consisting of plastic, paper, cardboard, and a woven material.

22. The method according to claim 12 wherein the boding agent is a lacquer.

23. The method according to claim 12 wherein the release agent is selected from the group consisting of atmospheric oxygen, carbon dioxide, and water.

* * * * *